J. COOPER.
DIFFERENTIAL CHANGE SPEED GEAR.
APPLICATION FILED DEC. 20, 1915.

1,279,658.

Patented Sept. 24, 1918.

Witness
Jno. H. Nelson

Inventor:
John Cooper

UNITED STATES PATENT OFFICE.

JOHN COOPER, OF CHICAGO, ILLINOIS.

DIFFERENTIAL CHANGE-SPEED GEAR.

1,279,658.

Specification of Letters Patent. Patented Sept. 24, 1918.

Application filed December 20, 1915. Serial No. 67,711.

*To all whom it may concern:*

Be it known that I, JOHN COOPER, a subject of the King of England, residing at Chicago, in the county of Cook and State of Illinois, have invented certain new and useful Improvements in Differential Change-Speed Gears, of which the following is a specification.

My invention relates to change gears and has particular reference to their construction for the use of automobiles. The objects of the invention are simplification of construction, economy of space, and the introduction of certain detail improvements in the interest of safety and reduced complexity, all as hereinafter described in detail, illustrated in the accompanying drawing, and more particularly pointed out in the appended claims.

In the drawing:—

Figure 1:
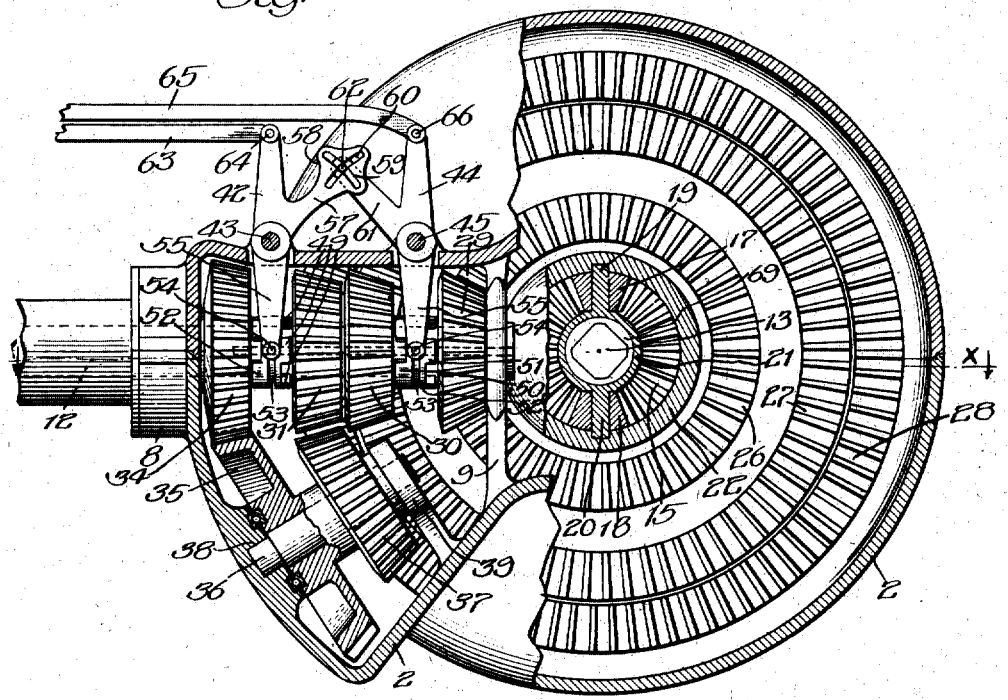
Figure 1 is an elevation of a change gear embodying my invention, the gear casing being partly broken away and partly in section.
Figure 2:
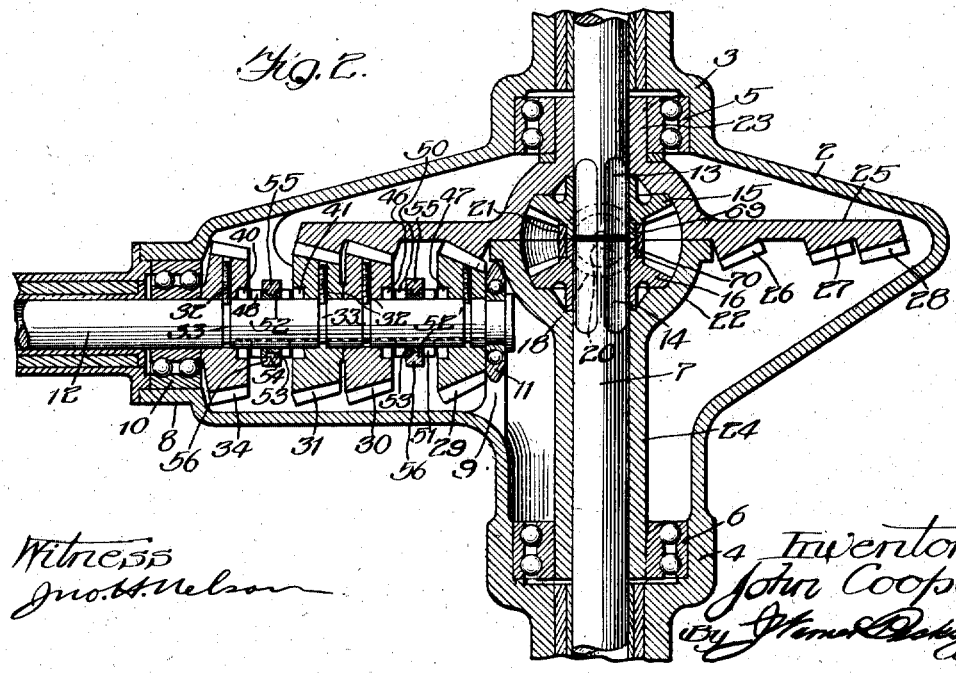
Fig. 2 is a section taken substantially on line X—X of Fig. 1.

In the several views 2 represents the gear casing having hubs 3 and 4 thereon containing ball bearings 5 and 6 for a driven shaft 7 which may represent the axle of a self propelling vehicle. A similar hub 8 and a bearing support 9 projecting from an interior wall of the casing support, by any suitable arrangement, ball bearings 10 and 11 for a driving shaft 12 driven by any of the usual forms of engine. The shaft 7 is provided with a usual differential gear and is for that purpose divided in two parts with meeting squared ends 13 and 14 which engage rectangular openings in bevel gears 15 and 16 that mesh with bevel gears 17 and 18 on pins or shafts 19 and 20 the ends of which are mounted in a spacer sleeve 21 and the gear case 22,—which has hub or sleeve portions 23 and 24 which normally rotate with the shaft 7 which is rotably connected with the sleeve or hub portions 23 and 24 and the case 22 by the four bevel gears mentioned. The casing 22 is substantially the hub portion of a multiple face gear on which is a plurality of rings of gears 26, 27 and 28, representing in the present instance three different speeds. The gear 26 is in mesh with a gear 29, the gear 27 with a gear 30, and the gear 28 with a gear 31, each loose on the engine shaft 12, rotatably, and held against longitudinal movement along said shaft by a screw 32 which engages an annular slot 33 formed in the shaft. Provision for reversing the movement through the medium of the slow speed gear 31, is made by means of a gear 34, also normally loose on the shaft, which is in mesh with a gear 35 keyed to a shaft 36 to which is also keyed a gear 37 which is in mesh with the gear 38. One end of the shaft 36 is mounted in a bearing recess 38 in the casing and the other end of said shaft has its bearing in a lug or post 39 which may be cast integral with the casing 2.

As shown in Fig. 1 provision is made for keying either one of the gears on the shaft 12 to said shaft and to prevent the accidental keying of two gears to the shaft at the same time. In the vertical faces facing each other of the gears 31 and 34 are clutch slots 40 and 41 into either of which a clutch member or other suitable interlocking device, is moved by means of a lever 42 fulcrumed at 43 on the casing and in an opening therein. A similar lever 44 is fulcrumed at 45 and moves another similar clutch member into either recesses 46 in the wheel 30 or similar recesses 47 in the wheel 29. 48 and 49 represent the teeth or lugs projecting from opposite sides of one of the clutch members and 50 and 51 represent corresponding teeth or lugs which project oppositely on the other clutch member. The clutch member moved by the lever 42 is designated as 52 and the member moved by the lever 44 is designated by the numeral 52'. In each of these clutch members 52 and 52' is a peripheral slot 53 that is engaged by a pair of lugs 54 that extend toward each other on a usual form of sliding clutch fork composed of arms 55 and 56 constituting the load-end of each lever.

On the lever 42 is an arm 57 that carries a disk 58 in which is a slot 59 that is curved on the axis 43 and a slot 60 curved on the axis 45. On the lever 44 is a similar arm 61 that carries a pin 62 which must move in the path of the slot 60 when the lever 44 is operated and which must be in line with the slot 59 when the lever 42 is moved to key either of its gear wheels to the shaft 12. Hence neither lever can be moved except when its companion is in neutral position shown in Fig. 1 and accidental connection of two bevel gears with the shaft 12 is automatically prevented. The lever 42 is connected with the operator's hand lever by means of a rod or other suitable form of connection 63 pivoted at 64 to the power end of the lever 42. A similar rod 65 is coupled at 66 to the lever 44. The safety arrangement represented by the cooperating arms 57 and 61 and their parts is not limited to the exact positions in which they are shown or to the particular two levers 42 and 44, nor are the latter as actuating means for the clutch members 52 and 52' representatives of exclusive details for this purpose.

From the foregoing description it will be seen that the reverse, or back-up, movement lever 42 is utilized to add a third speed to the usual two-speed provided in various forms for the differential gear rear axle, or shaft 7 herein; that the back-up lever is made automatically interdependent with the forward movement mechanism and lever, and that in this instance there are two forward movement levers, the lever 42 being for both forward and backward movement, the forward movement and the reverse movement gears are within the same casing, and, owing to the arrangement of all loose-on-the-shaft gears or pinions on one shaft with all the ring gears fixed relative to each other, the casing space occupied by both forward and backward movement gears is comparatively small. The arrangement herein of having all the ring gears fixed and all the pinions normally loose also obviates the more or less complicated lever connections when clutches are mounted on both shafts 7 and 12, and also reduces the number of breakable and comparatively inaccessible parts within the gear casing 2. The details involved in rotatably connecting the pinions 29, 30, 31 and 34 with the shaft 12 and the distances that the respective pinions are spaced apart as well as the relative sizes of the ring gears 26, 27 and 28, may be varied to meet individual needs without departing from the spirit of this invention, for which also are available, for instance, many of the various devices for keying temporarily a gear or pinion to a shaft.

Having thus described my invention, I claim as new and desire to secure by Letters Patent—

1. The combination with a driving shaft, of a plurality of beveled pinions rotatively connected to said shaft, clutch elements carried by said pinions, slidable clutch elements splined to said shaft and adapted to be selectively engaged with the pinion clutch elements, a driven element, a series of concentric rows of gear teeth on said driven element, reversing gears, one of said reversing gears constantly meshing with one of said concentric rows of teeth, and the other with one of said beveled pinions, and the other beveled pinions constantly meshing with the said concentric rows of teeth.

2. The combination with a driving shaft, of a driven shaft, a plurality of change speed gears for rotating said driven shaft at different rates of speed in one direction relative to the driving shaft, coupling mechanisms for connecting said driving shaft with the different speed gears, reverse movement gears, and means for operatively connecting and disconnecting same with and from said driving shaft, a pair of levers for actuating the driving shaft connection mechanisms for all of said change speed gears and reverse movement gears, and means rendering one of said levers inoperative by the operation of the other lever.

3. The combination with a shaft, of a reversing gear pinion and three ring gear pinions having clutch elements thereon and being rotatable on said shaft, a clutch member slidably splined to said shaft and adapted to be engaged with either said reversing gear pinion or one of said ring gear pinions, a similar clutch member similarly arranged between the remaining two pinions, levers operatively connected with said clutch members and having arms with overlapping parts thereon, one of said arms having intersecting slots therein and the other arm having a pin that is movable in said slots.

In testimony whereof I have hereunto signed my name.

JOHN COOPER.